Feb. 12, 1952 P. K. BRIDENBAUGH ET AL 2,585,622

RECORD ADAPTER

Filed Sept. 15, 1949

INVENTORS.
Paul K. Bridenbaugh
Frank A. Jansen
BY
Dawson & Dawson (signature)
Attys.

Patented Feb. 12, 1952 2,585,622

UNITED STATES PATENT OFFICE 2,585,622

RECORD ADAPTER

Paul K. Bridenbaugh and Frank A. Jansen, Chicago, Ill., assignors to Webster-Chicago Corporation, Chicago, Ill., a corporation of Illinois Application September 15, 1949, Serial No. 115,858

4 Claims. (Cl. 274—42)

My invention relates to an adapter in the form of an insert for use with a phonograph disc record having a relatively large center hole, the purpose being to reduce the size of the hole to substantially the diameter of the usual turntable spindle.

At the present time there are many disc records actively sold on the market made of Vinylite or other like synthetic material, and having center holes of approximately $1\frac{1}{2}''$ diameter. A characteristic of these records is that they are quite flexible and resilient, and almost non-breakable. These records cannot be played on phonographs designed to accommodate records with center holes of about $\frac{9}{32}''$ which in the past has been standard. The adapter of my invention makes it possible to play disc records having the newly introduced large diameter center holes on phonographs which otherwise could accommodate only records having the small diameter center holes.

This adapter which may be die cast from a suitable metal can be made to weigh about 7 grams and when inserted in a disc record of about 14 grams weight the total will be around 21 grams. It is desirable that the weight of these new type records be somewhat increased so that the topmost one in a stack on a turntable may be effectively driven by its frictional contact with the one below, and so on. The insert adapter of my invention is of a thickness which is slightly less than that of the record with which it is used, and when fitted in place it lies very slightly inwardly of both surface planes of the record itself so that friction between adjacent disc records in the stack is confined to the record annulus which encircles the insert. At this point the frictional value is sufficient to assure a driving connection, particularly when the weight of the inserts is added to that of the records involved.

This adapter is efficient, inexpensive to produce, and can be quickly fitted to a disc record with a minimum of effort. In the drawings.

The phonograph herein illustrated comprises the usual platform P below which is supported suitable operating mechanism for driving a turntable T which is exposed upon the top side of the platform. A spindle S is extended upwardly through the turntable and through the center hole of each disc record R that is supported thereupon.

Figure 1:
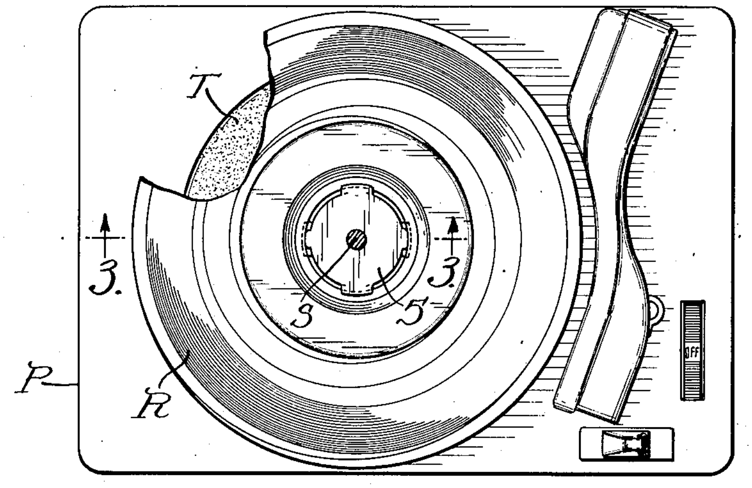
Figure 1 is a top plan view of a phonograph on whose turntable is a disc record equipped with my center hole insert adapter.
Figure 2:
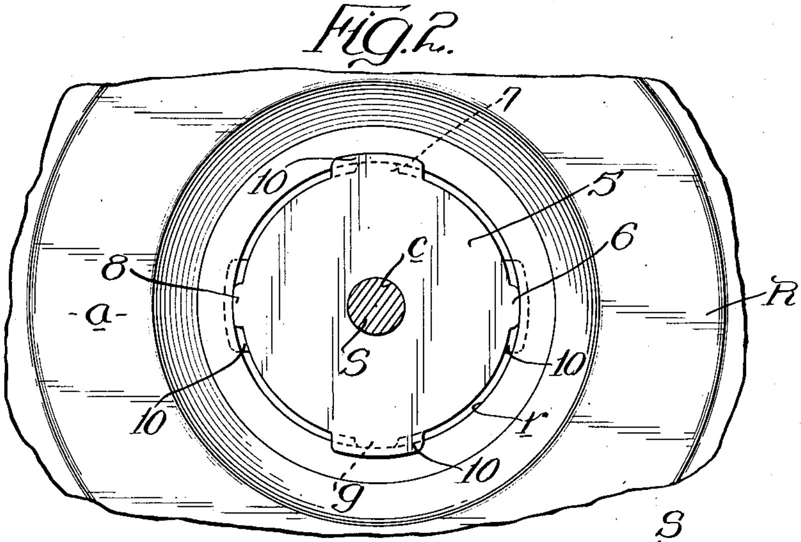
Fig. 2 is an enlarged fragmentary plan view of a record wherein the adapter is operatively fitted.
Figure 3:
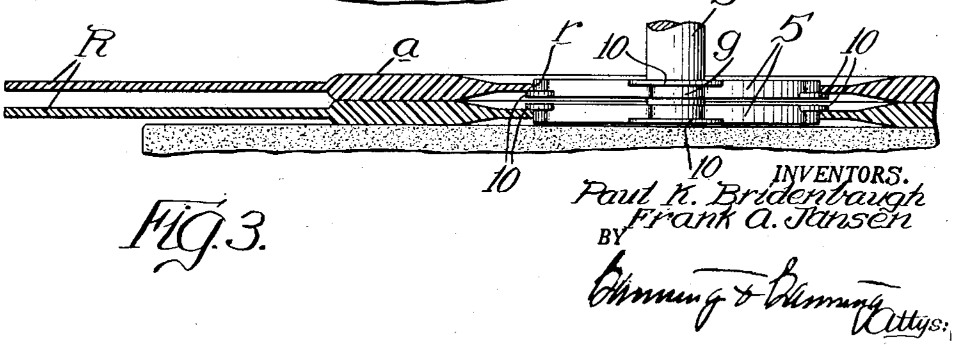
Fig. 3 is a detail in vertical section, taken on line 3—3 of Fig. 1, showing a turntable supporting two stacked records each equipped with the present adapter.

This invention is concerned with an insert adapter A having a center hole *c* of the desired size to receive a turntable spindle. The adapter comprises a flat circular disc-like body 5 having a plurality of bosses extended radially outwardly from its periphery. As herein shown, four such bosses 6, 7, 8, 9 are provided. These bosses which are equidistant from the center hole *c* are also equidistant from each other. A flange 10 extends radially outwardly from the three outer sides of each boss to form therewith a shoulder. The flanges on the opposite bosses 6 and 8 face upwardly while the flanges on the two remaining opposite bosses 7 and 9 face downwardly as shown in Figs. 2 and 3. Thus each side of the adapter has two upwardly facing flanges and two downwardly facing flanges carried by similar bosses which are spaced 90° apart.

The adapter is receivable in the center hole *r* of a record having the requisite flexibility, such as those made of Vinylite. This operation involves placing of the adapter in the center hole with the two downwardly facing flanges 10 on the bosses 7 and 9 engaging the upper face of the record adjacent its hole *r* and the boss 8 engaging the under face of the record. When in this position the adapter will be slightly off center in the direction of the boss 8 while the opposite boss 6 and its flange will be positioned over the record hole near the edge thereof. The adapter will also be off-normal relative to the axis of the record. By pressing downwardly upon the boss 6 and simultaneously bending upwardly the two sides of the record opposite the bosses 8 and 6, the flange of the latter boss will pass through the record hole. Thereafter a slight pressure upon the adapter edgewise from the direction of the boss 8 toward the boss 6 will center the adapter and cause the boss 8 to disengage itself from the under side of the record and slip into position within the confines of the record hole *r* with the flange of the boss 8 engaging the under side of the record. The boss 6 will likewise be positioned within the confines of the hole with its flange also engaging the under side of the record. With these manipulations completed the adapter is securely centered within the record hole with all four bosses in endwise frictional engagement with the periphery of the record hole. This assures prevention of both axial and radial movements between the adapter and the record. The flanges on bosses 7 and 9 will remain in frictional engagement with one side of the record and the flanges on bosses 6 and 8 in frictional engagement with the other side of the record, thus positively locking the adapter in place centrally of the record R.

A feature of the present adapter is its thinness which enables it to fit centrally of the associated disc and inwardly of the planes of the opposite surfaces of a surrounding annulus *a* which is relatively thick (see Fig. 3). When several records each equipped with the adapter are stacked one upon another the adapters remain spaced apart so that contact between the records is confined to the engaged faces of this annulus. The frictional value of this interengagement is enhanced by the added weight of the adapter, thereby making for an effective frictional drive which is transmitted from the turntable through one or more discs imposed thereon to the top most disc under play. Another point of advantage is the radial rigidity of the adapter which remains perfectly centered with respect to its associated disc under all conditions. Assembly of this rigid adapter with a phonograph disc requires that the latter be sufficiently flexible to execute the deflecting movements hereinbefore noted when the adapter is being fitted in place or being moved therefrom. It is because one of these two components is endowed with resiliency to a certain degree that it is possible for the present adapter to become operatively positioned in the record.

We claim:

1. As a new article of manufacture, an adapter in the form of a relatively inflexible one-piece circular disc having a hole in its center, four bosses struck radially outwardly from the disc and spaced circumferentially from each other, a flange outwardly extended radially from each boss in flush relation with the disc and so disposed that every other flange faces toward the same side of the disc, said bosses being engageable edgewise at widely spaced points with the periphery of the center hole in a flexible circular record when said flanges are engaged with the side of a record adjacent the hole therein to maintain the disc concentric with the record but spaced therefrom except where engaged by the bosses and flanges.

2. As a new article of manufacture, an adapter in the form of a relatively inflexible one-piece circular disc having a hole in the center thereof, a plurality of circumferentially spaced bosses extended radially outwardly from said disc, and a flange extended radially outwardly from each boss in flush relation with the disc and forming therewith a shoulder arranged to engage at spaced points with the side of a flexible circular record when the several bosses are engaged with the periphery of the hole therein to maintain the disc concentric with the record but spaced therefrom except where engaged by the shoulders.

3. For use with a flexible circular phonograph record, an adapter in the form of a relatively inflexible one-piece circular disc having a hole in its center, a plurality of circumferentially spaced oppositely facing shoulders extending radially outwardly therefrom and in flush relation therewith, certain of the shoulders being axially faced one way to engage at spaced points the periphery of the center hole in the record and one side thereof and the remaining shoulders being oppositely faced to engage at spaced points the periphery of said center hole and the other side of said record, said shoulders being co-radial and equidistant from each other and arranged about the outside edge of the disc so that like shoulders are alternately spaced and act to maintain the disc concentric with the record but spaced therefrom except where engaged by the shoulders.

4. An adapter as in claim 3 which is provided with four radially extended shoulders three of which are initially operatively engageable with the record requiring flexation of the record preliminary to operative positioning therewith of the fourth shoulder by a combined axial and radial movement relative thereto.

PAUL K. BRIDENBAUGH.
FRANK A. JANSEN.

REFERENCES CITED

The following references are of record in the file of this patent:

UNITED STATES PATENTS

| Number | Name | Date |
|---|---|---|
| 832,403 | Milans | Oct. 2, 1906 |
| 1,755,743 | Morrison | Apr. 22, 1930 |
| 2,283,797 | Dech | May 19, 1942 |

FOREIGN PATENTS

| Number | Country | Date |
|---|---|---|
| 725,759 | France | Feb. 16, 1932 |
| 735,808 | France | Sept. 6, 1932 |